United States Patent
Garg et al.

(10) Patent No.: US 10,282,453 B2
(45) Date of Patent: May 7, 2019

(54) CONTEXTUAL AND INTERACTIVE SESSIONS WITHIN SEARCH

(71) Applicant: Microsoft Technology Licensing, LLC, Redmond, WA (US)

(72) Inventors: Puneet Garg, Hyderabad (IN); Sharat Attupurath, Hyderabad (IN); Anirudha Udaykumar Bodhankar, Hyderabad (IN); Prashant Satishchandra Borole, Hyderabad (IN); Achal Gupta, Hyderabad (IN); Divya Sharma, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 335 days.

(21) Appl. No.: 14/961,189

(22) Filed: Dec. 7, 2015

(65) Prior Publication Data
US 2017/0161339 A1 Jun. 8, 2017

(51) Int. Cl.
*G06F 17/30* (2006.01)
*H04L 29/08* (2006.01)

(52) U.S. Cl.
CPC .... *G06F 17/30554* (2013.01); *G06F 17/3053* (2013.01); *H04L 67/306* (2013.01)

(58) Field of Classification Search
CPC ........... G06F 17/30554; G06F 17/3053; H04L 67/306
See application file for complete search history.

(56) References Cited

U.S. PATENT DOCUMENTS

| | | | |
|---|---|---|---|
| 8,521,725 B1 | 8/2013 | Pearson et al. | |
| 9,015,140 B2 | 4/2015 | Wu et al. | |
| 2005/0071328 A1 | 3/2005 | Lawrence | |
| 2008/0005313 A1 | 1/2008 | Flake et al. | |
| 2008/0140644 A1 | 6/2008 | Franks et al. | |
| 2009/0228817 A1* | 9/2009 | Adams | G06F 17/30696 715/767 |
| 2010/0070486 A1 | 3/2010 | Punaganti et al. | |

(Continued)

FOREIGN PATENT DOCUMENTS

WO 2012160567 A1 11/2012

OTHER PUBLICATIONS

Mooney, Raymond, "Using Markov Logic Networks to Infer User Intent for Search Queries", Published on: Aug. 31, 2009 Available at: http://research.microsoft.com/en-us/um/redmond/about/collaboration/awards/beyondsearchawards.aspx.

(Continued)

*Primary Examiner* — Alexander Khong
(74) *Attorney, Agent, or Firm* — Shook, Hardy & Bacon, L.L.P.

(57) ABSTRACT

Aspects of the technology described herein are directed towards providing a contextual interactive session (or activity) within the context of search. Search is typically a one-way communication with little to no interaction provided to a user. Aspects of the technology can provide an interactive session within search to increase user engagement. The interactive sessions can include games, quizzes, polls, riddles, crosswords, etc. The output may be configured such that interaction with the interactive session does not alter the original output such that a user is able to engage with the interactive session on the same page and is not navigated to a different destination.

17 Claims, 8 Drawing Sheets

(56) References Cited

U.S. PATENT DOCUMENTS

| | | |
|---|---|---|
| 2012/0158685 A1 | 6/2012 | White et al. |
| 2013/0226916 A1 | 8/2013 | Dredze et al. |
| 2014/0129942 A1 | 5/2014 | Rathod |
| 2014/0280185 A1* | 9/2014 | Nordstrom ........ G06F 17/30321 707/741 |
| 2014/0298200 A1* | 10/2014 | Cierniak ............. H04L 65/1069 715/753 |
| 2015/0046444 A1 | 2/2015 | Afkhami et al. |
| 2015/0127628 A1 | 5/2015 | Rathod |

OTHER PUBLICATIONS

White, et al., "Predicting Short-Term Interests Using Activity-Based Search Context", "In Proceedings of the 19th International Conference on Information and Knowledge Management", Oct. 26, 2010, 10 pages.

Takagi, et al., "On-line Knowledge Embedding for an interactive EC-based Montage System", In Proceedings of Third International Conference Knowledge-Based Intelligent Information Engineering Systems, Aug. 31, 1999, pp. 280-283.

Gossen, et al., "Search Result Visualization with Characters for Children", In Proceedings of 13th international conference on Interaction Design & Children, Jun. 17, 2014, pp. 125-134.

White, et al., "Enhancing Personalized Search by Mining and Modeling Task Behavior", In Proceedings of 22nd International World Web Conference, May 13, 2013, 10 pages.

Sieg, et al., "Web Search Personalization with Ontological User Profiles", In Proceedings of the Sixteenth ACM Conference on Information and Knowledge Management, Nov. 6, 2007, 10 pages.

Gillet, et al., "Personal Learning Environments and Embedded Contextual Spaces", In Proceedings of 1st International Workshop on Cloud Education Environments, Nov. 15, 2012, pp. 38-40.

Hoeber, et al., "Real-World User Evaluations of a Visual and Interactive Web Search Interface", In Proceedings 13th International Conference of Information Visualisation, Jul. 15, 2009, pp. 119-126.

Agarwal, Amit, "How to Embed Almost Anything in your Website", Published on: Jan. 9, 2009 Available at: http://www.labnol.org/internet/how-to-embed-in-html-webpages/6365/.

Daoud, et al., "Contextual Query Classification for Personalizing", In Proceedings of Second ACM International Conference on Web Search and Data Mining, Feb. 9, 2009, 10 pages.

* cited by examiner

310 — cricket world cup 2015

Web  Images  Videos  Maps  News  More

CRICKET WORLD CUP 2015

| GROUP MATCHES | QUARTER FINALS | SEMI FINALS | FIXTURES | STANDINGS | LEADERS | FINALS |

< Sat, 14 Feb   Sun, 15 Feb   Mon, 16 Feb   Tue, 17 Feb   Web, 18 Feb >

Match 1, Pool A
Sri Lanka                           LIVE
New Zealand

Saturday, 14 February at 3:30 AM
Hagley Oval, Christchurch

Sri Lanka
104/2 (14.5)                vs      New Zealand
RR: 6.80 - Projected: 340

Match 2, Pool A
England                                                  8:50 AM
Australia

312

Poll of the Day — 314

Who according to you will win the most Man of the Match awards for India in this World Cup?

● John Doe
○ Bob Smith
○ Ed Johnson
○ Joe Thompson — 318

[Submit] [Share]   [More]
        316        See results

2015 Cricket World Cup

The ICC Cricket World Cup 2015 will be the 11th ICC Cricket World Cup...

Cricket World Cup 2015 | Official Website
www.url.com
Follow the Cricket World Cup, 14 Feb-28 Mar, 2015 in Australia and New Zealand. Official source of tickets, news, schedules...

CONTEXTUAL AND INTERACTIVE SESSIONS WITHIN SEARCH

BACKGROUND

Search engines today do a great job at identifying what a user is looking for and providing that information. Search is highly optimized for information gain and task completion. This makes the user experience monotonous and boring. Search continues to expand and users are spending more and more time using search as it is viewed to be an entry point to the web. Currently, search engines are not taking advantage of this opportunity and do not offer opportunities for users to engage and have fun in the context of the user query while searching for information.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Aspects of the technology described herein are directed towards systems, methods, and computer storage media for, among other things, providing interaction sessions within search. The context of search includes web search but can be extended to any search experience. A search query, be it a web search query or any other search query, is evaluated to identify one or more of an entity or an intent. An entity generally refers to a subject matter or topic. In this regard, an entity might be a person, place, thing, or other topic. The entity and/or intent may be used to identify whether a query should be associated with an interaction session. For each entity or intent, one or more activities may be associated therewith. To determine which activity is most appropriate to provide, a user preference may be considered as well as other factors such as success of past activities with the search query, success of past activities with the user, and the like. The activities may be ranked according to this criteria and a highest ranking activity may be selected. A selected activity is then embedded within the search result page and provided for display.

BRIEF DESCRIPTION OF THE DRAWINGS

Aspects of the technology described in the present application are described in detail below with reference to the attached drawing figures, wherein:

FIG. 3 is an exemplary interface illustrating an embedded activity, in accordance with an aspect of the technology described herein;

FIG. 4 is an exemplary interface illustrating an embedded activity, in accordance with an aspect of the technology described herein;

DETAILED DESCRIPTION

The technology of the present application is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Having briefly described an overview of aspects of the technology described herein, an exemplary operating environment suitable for use in implementing the technology is described below.

Exemplary Operating Environment

Figure 1:
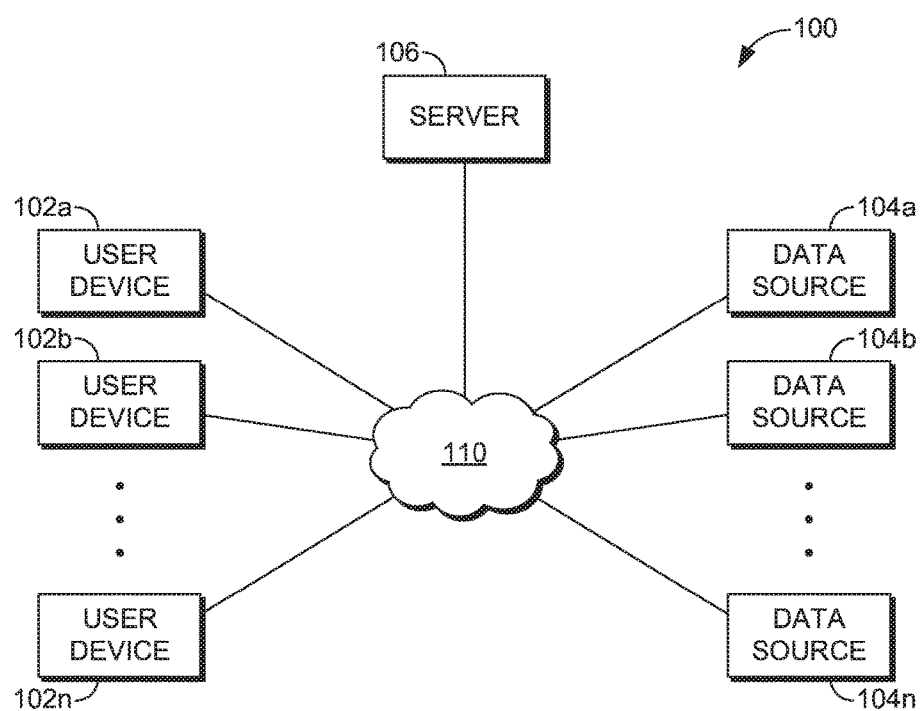
FIG. 1 is a block diagram of an exemplary computing environment suitable for implementing aspects of the technology described herein.

Turning now to FIG. 1, a block diagram is provided showing an example operating environment 100 in which some aspects of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; and network 110. It should be understood that environment 100 shown in FIG. 1 is an example of one suitable operating environment. Each of the components shown in FIG. 1 may be implemented via any type of computing device, such as computing device 800 described in connection to FIG. 8, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

User devices 102a and 102b through 102n can be client devices on the client-side of operating environment 100, while server 106 can be on the server-side of operating environment 100. The user devices can provide search queries for identifying activities, or interaction sessions, to associate with the search queries and receive a search result page having an activity embedded therein.

Server 106 can comprise server-side software designed to work in conjunction with client-side software on user devices 102a and 102b through 102n so as to implement any combination of the features and functionalities discussed in the present disclosure. For example, the server 106 may run an activity engine, such as the activity engine 206, which generates search result pages having interaction sessions embedded therein. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one aspect, user devices 102a through 102n may be the type of computing device described in relation to FIG. 8 herein. By way of example and not limitation, a user device may be embodied as a personal computer (PC), a laptop computer, a mobile or mobile device, a smartphone, a tablet computer, a smart watch, a wearable computer, a virtual reality headset, augmented reality glasses, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, or any other suitable device.

Data sources 104a and 104b through 104n may comprise data sources and/or data systems, which are configured to make activity data or user data available to any of the various constituents of operating environment 100, or system 200 described in connection to FIG. 2. (For example, in one aspect, one or more data sources 104a through 104n provide (or make available for accessing) user interaction session preference data to activity engine 206 of FIG. 2.) Data sources 104a and 104b through 104n may be discrete from user devices 102a and 102b through 102n and server 106 or may be incorporated and/or integrated into at least one of those components. The data sources 104a though 104n can comprise a knowledge base that stores information about activities, users, etc.

Figure 2:
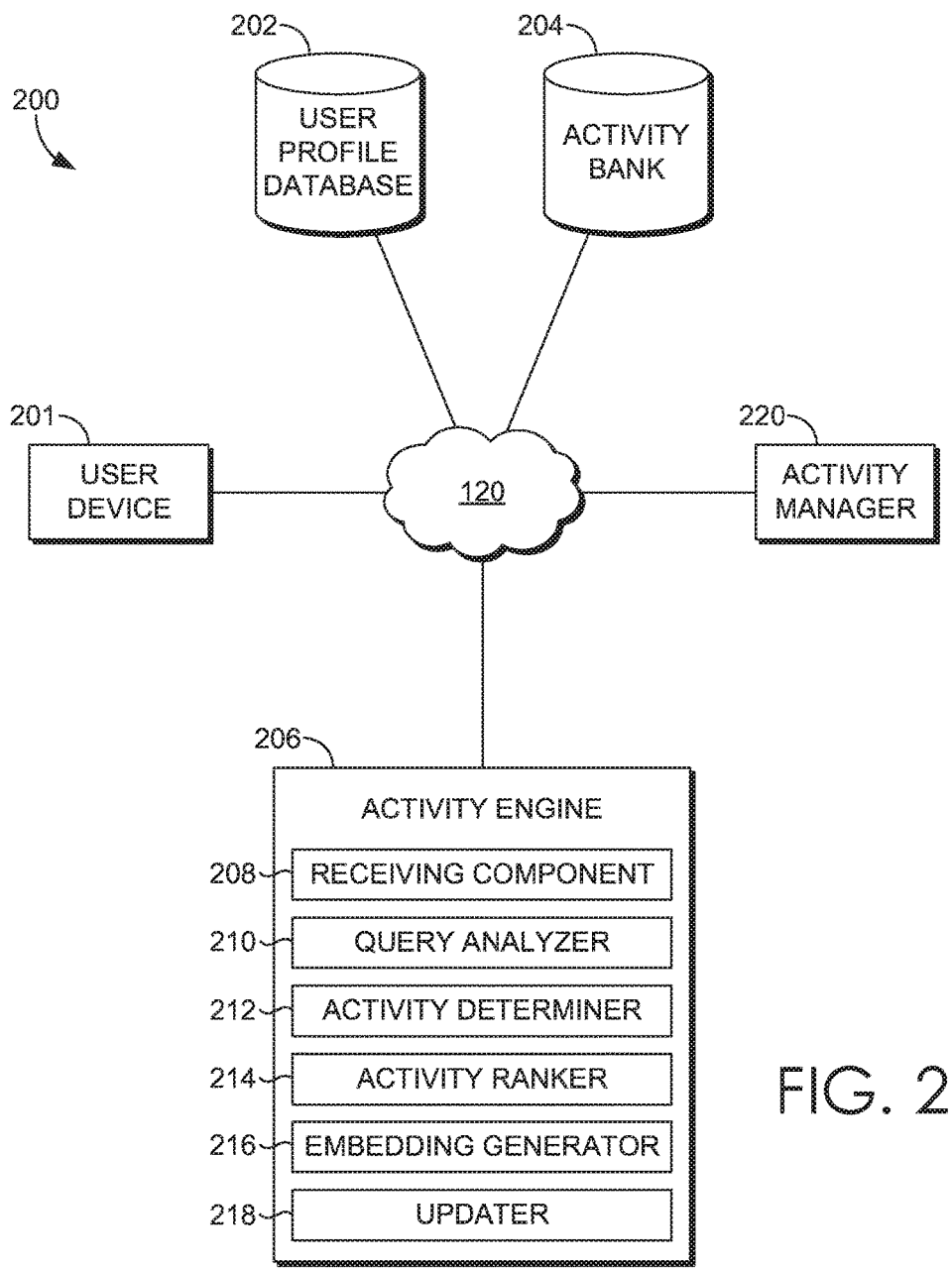
FIG. 2 is a diagram depicting an exemplary computing environment for embedding activities into search, in accordance with an aspect of the technology described herein.

Operating environment 100 can be utilized to implement one or more of the components of system 200, described in FIG. 2, including components for identifying interaction sessions to embed within a search context (e.g., a search result page). It should be understood that any number of user devices, servers, and data sources may be employed within operating environment 100 within the scope of the present disclosure. Each may comprise a single device or multiple devices cooperating in a distributed environment. For instance, activity engine 206 may be provided via multiple devices arranged in a distributed environment that collectively provide the functionality described herein. Additionally, other components not shown may also be including within the distributed environment.

Referring now to FIG. 2, with FIG. 1, a block diagram is provided showing aspects of an example computing system architecture suitable for implementing an aspect of the technology described herein and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 120, which is described in connection to FIG. 1 (and represented as reference numeral 110 in FIG. 1), and which communicatively couples components of system 200 including a user device 201, a user profile database 202, an activity bank 204, and an activity engine 206 (including its components a receiving component 208, a query analyzer 210, an activity determiner 212, an activity ranker 214, an embedding generator 216, and an updater 218) may be embodied as a set of compiled computer instructions or functions, program modules, computer software services, or an arrangement of processes carried out on one or more computer systems, such as computing device 800 described in connection to FIG. 8, for example.

In one aspect, the functions performed by components of system 200 are associated with one or more applications, services, or routines. In particular, such applications, services, or routines may operate on one or more user devices (such as user device 102a), servers (such as server 106), may be distributed across one or more user devices and servers, or be implemented in the cloud. Moreover, in some aspects, these components of system 200 may be distributed across a network, including one or more servers (such as server 106) and client devices (such as user device 102a), in the cloud, or may reside on a user device, such as user device 102a. Moreover, these components, functions performed by these components, or services carried out by these components may be implemented at appropriate abstraction layer(s), such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some aspects functionality of these components can be shared or distributed across other components.

Figure 8:
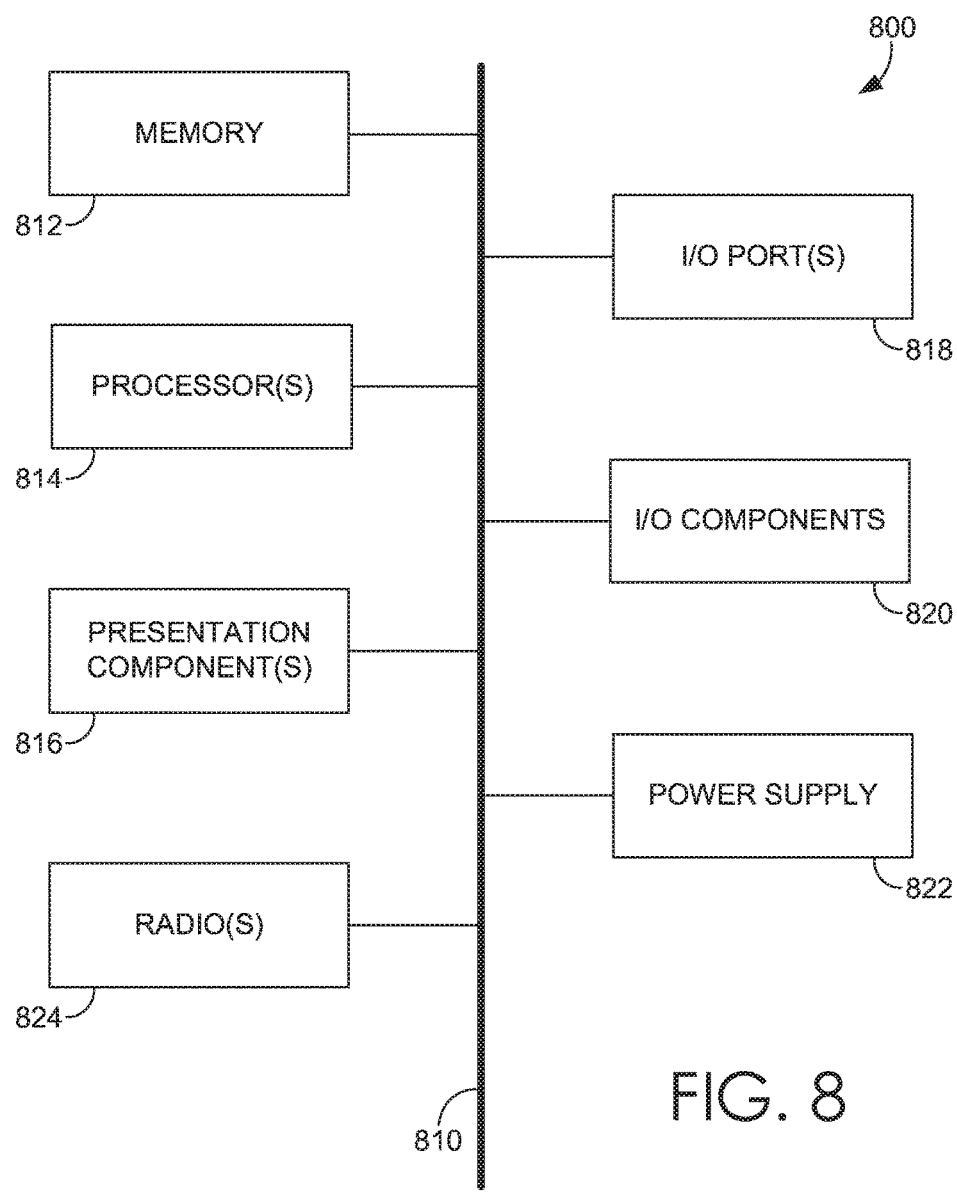
FIG. 8 is a block diagram of an exemplary computing environment suitable for implementing aspects of the technology described herein.

User device 201 may be any device described in relation to FIG. 8 herein. By way of example and not limitation, a user device may be embodied as a personal computer (PC), a laptop computer, a mobile device, a smartphone, a tablet computer, a smart watch, a wearable computer, a virtual reality headset, augmented reality glasses, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, or any other suitable device.

The databases, including user profile database 202 and activity bank 204, can be accessible to any components illustrated in the example operating environment 100.

The databases (user profile database 202 and activity bank 204) can comprise, among other things, user profiles associated with interaction sessions including, for instance, user preferences of interaction sessions, a user's history related to interaction sessions, and the like. The databases may further include a plurality of interaction sessions/activities with which to choose from. The user profile database 202 and the activity bank 204, while represented as separated entities in FIG. 2 for the sake of clarity, may, in fact, be a single entity.

The activity engine 206 can comprise server-side software designed to work in conjunction with client-side software on the user device 201 so as to implement any combination of the features and functionalities discussed in the present disclosure. For example, the activity engine 206 may run on a server and identify appropriate interaction sessions. As previously explained with respect to FIG. 1, this division of system 200 is provided to illustrate one example of a suitable environment, and there is no requirement for each implementation that any combination of the activity engine 206 and the user device 201 remain as separate entities.

The activity engine 206 comprises a receiving component 208, a query analyzer 210, an activity determiner 212, an activity ranker 214, an embedding generator 216, and an updater 218. The activity engine 206 may have access to one or more components of the system 200 such as the user profile database 202, the activity bank 204, and the like. The activity engine 206 can facilitate selection of interaction sessions within search. The activity engine 206 may be embodied as a set of compiled computer instructions or functions, program modules, computer software services, or an arrangement of processes carried out on one or more computer systems, such as computing device 800 described in connection with FIG. 8, for example.

Initially, the activity engine 206 facilitates selection of interaction sessions in the context of search. An interaction session, as used herein, refers generally to an activity provided that elicits a user input. For instance, a quiz is an interaction session that seeks a user's input in the form of an answer. A poll, for example, seeks a user to select at least one of a set of provided options. A crossword puzzle, for example, seeks a user to input a word in response to provided clues. Thus, interaction sessions are opportunities for user interaction.

Interaction sessions, in the present disclosure, may be associated with search queries. The interaction sessions may be associated with search queries in real time as search query indications are received by, for example, the receiving component 208, or they may be associated with exemplary search queries in an offline setting and stored in a database for use by the system 200. The receiving component 208 may receive a search query upon a search query being entered into a query input box and submitted to a search engine, for instance. Any other type of search query may be received by the receiving component 208 such as queries issued within social media sites, etc.

The query analyzer 210 evaluates search queries to identify information utilized in selecting interaction sessions. The interaction sessions may be associated with search queries based on intent of a search query, an entity of a search query, or the like. Intent, as used herein, refers generally to what a user intends to gain with a search. For example, a query of "homemade recipes" may be identified as a search intended to gain access to recipes such as chicken noodle soup. An entity, as previously described, refers generally to a subject matter or topic. In this regard, an entity might be a person, place, thing, or other topic.

The activity determiner 212 identifies interaction sessions to associate with queries. Particular interaction sessions may be associated with particular entities and/or intents. For instance, an entity such as a celebrity (e.g., Tom Cruise) may be associated with a poll on celebrity awards while an intent directed to recipes may be associated with a crossword puzzle having recipe-based clues such as identifying the abbreviation for a teaspoon. Queries may be associated with more than one interaction session, if any. Some queries may not be associated with interactions sessions at all. In that situation, no interaction sessions will be identified to provide in response to the query.

Interaction sessions may also be associated with multiple entity variations. For instance, a search for "Jolie" may confidently be mapped to "Angelina Jolie", "Angie Jolie", "Brad Pitt's wife", and the like. The interaction session may be associated with numerous variations of the same entity.

In the event that at least one interaction session is associated with one or more of the entity or intent of the query, it is determined that the query is associated with at least one interaction session. When a query is determined to be associated with at least one interaction session, the system 200 then determines which interaction session to provide. One or more interaction sessions may be provided for each query. Determining which interaction session to provide may depend on how many interaction sessions are identified as associated with the query. For instance, if only one interaction session is identified as associated with the query, the one interaction session will be automatically provided in response to the query. However, if more than one interaction session is identified, additional analysis may be required. User preferences regarding interaction sessions may be utilized. For example, the interaction sessions may be different types. Exemplary interaction session types include polls, games, quizzes, crosswords, riddles, and the like. User preferences for interaction sessions may prioritize types of interaction sessions on a per-user basis. For example, User A may prefer polls to games while User B may prefer games to polls. If no user data is present, a default setting may be applied to the user until sufficient user data has been collected through interaction patterns of the user during interaction sessions.

In addition to user preference data, historical data may also be utilized to determine which interaction session to select for a query. The historical data may indicate how an interaction session has performed in the past with the query, how an interaction session has performed in the past for a particular user, and the like.

Once the data is evaluated (e.g., user preference data, historical data, etc.), the interaction sessions may be ranked accordingly by the activity ranker 214. For example, for User A who prefers polls to games a poll would be ranked higher than a game if both were present in the selections. Rankings may be indicated by numerical values or any other known method of ranking.

Once the interaction sessions (activities) are ranked, a highest ranking interaction session is selected to provide in response to the query. In the event there is only one interaction session to choose from, that interaction session is automatically selected and the ranking step may be skipped. In the event more than one interaction session may be provided, the highest 'n' ranking interaction sessions may be selected, depending on the number 'n' designated to be selected.

The selected interaction sessions may then be embedded into the search result page or any other search context by the embedding generator 216. This may be achieved using any known means to merge various user interface modules together to provide a search result page having one or more interaction sessions embedded therein. The embedding generator 216 embeds the interaction sessions into the search result page such that it is not simply a link provided but, rather, embedded content. The embedding generator 216 merges the existing interface (e.g., search result page) and embeds the interaction session on top of/into the existing interface.

The updater 218 may be utilized to update content within the interaction session while maintaining the other content (non-interaction session content such as the search result page) and avoiding a page refresh of the other content. In other words, an interaction session may need to be updated (e.g., a user enters an answer to quiz question 1 of 9 and needs to be directed to quiz question 2 of 9) but the rest of the page (e.g., the search result page) should remain the same such that a user is not inadvertently navigated to a different web page. The updater 218 provides the capability to refresh only the interaction session portion of the web page while maintaining the content that is not the interaction session. Thus, the intent or entity-dependent interaction session is refreshed while the remaining content is not refreshed. The updater 218 may refresh the interaction session automatically (e.g., upon detecting input of an answer selection automatically advance to the next question of the quiz, upon detecting input of a response automatically show results of a poll, etc.) or the interface may be equipped with a "Refresh" indicator for selection when it is desired for the interaction session to be refreshed.

The updater 218 can also provide subsequent interaction sessions upon completion of an interaction session. For example, assume a user completes all 9 questions of the quiz referenced above. A subsequent interaction session may be provided to the user upon completion of the initial interaction session. The subsequent interaction session may be automatically provided upon completion of the initial interaction session or may be provided upon receipt of an indication to provide a subsequent interaction session.

In embodiments, the system 200 is configured to provide rewards upon completion of an interaction session. For instance, credits to use with retail providers may be issued, coupons, or the like.

In additional embodiments, the interaction sessions may be embedded into the search result page such that users are able to explore search results to complete the interaction session. For example, if the interaction session is a trivia game, users may be able to explore search results or continue searching to find an answer. In this embodiment, the search result page may be refreshed while the content of the interaction session remains the same.

Turning now to FIG. 3, an exemplary user interface 300 is shown, in accordance with an aspect of the technology described herein. FIG. 3 includes a query input area 310 where search queries may be entered. User interface 300 also includes search results areas 312 and 320. Search result area 320 includes what may be identified as general search results while search result area 312 includes what may be referred to as an answer result area. The answer result area of search result area 312 provides information that answers a query rather than links to other web pages to answer the query (as is provided in search result area 320). The user interface 300 also includes an interaction session 314 in the form of a poll. The interaction session 314 is illustrated here in the search result area 312 but may be embedded into any area of user interface 300. The interaction session includes various indicators that may be selected. The "submit" indicator allows an input to submit the poll to view results while the "see results" indicator allows an input to simply view results without entering an answer. The "submit" indicator would prompt the updater 218 to update the interaction session 314. The "more" indicator 318 provides additional interaction sessions. For example, if a user didn't want to take the poll, selection of the "more" indicator 318 would prompt the updater 218 to provide a subsequent interaction session. Alternatively, if the user takes the poll, views the results, and still wants more, selection of the "more" indicator 318 would prompt the updater 218 to provide a subsequent interaction session. The "more" indicator 318 may be provided any time an interaction session is provided so that the ability to retrieve another interaction session (if available) is accessible to a user.

Figure 5:
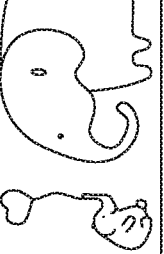
FIG. 5 is an exemplary interface illustrating an activity shared on a social media site, in accordance with an aspect of the technology described herein.

The user interface further includes a "share" indicator 316. The "share" indicator provides functionality to share the interaction session itself or the results thereof. The interaction session may be shared via email, text message, social media, etc. An exemplary share interface 500 is provided in FIG. 5 illustrating an interaction session 510 that is being shared on a social media site. Selection of the interaction session 510 may navigate a user to a destination where engaging with the interaction session is possible. For instance, if the interaction session 510 were shared from a search result page, selection of the interaction session 510 may navigate a user back to the search engine that originated the interaction session 510.

Figure 4:
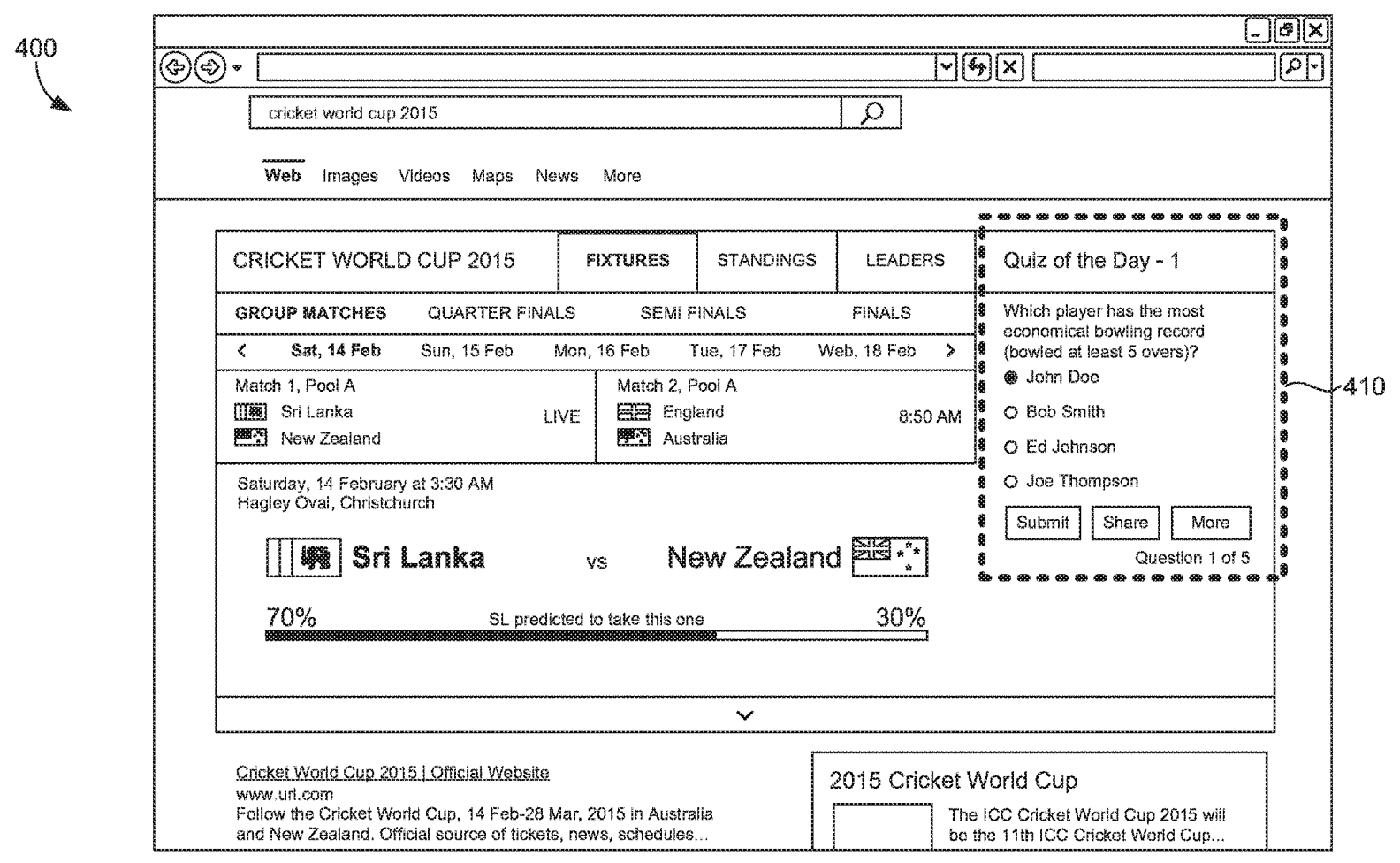

Turning now to FIG. 4, an exemplary user interface 400 is shown, in accordance with an aspect of the technology described herein. FIG. 4 includes an interaction session 410 in the form of a quiz embedded into the user interface 400.

Figure 6:
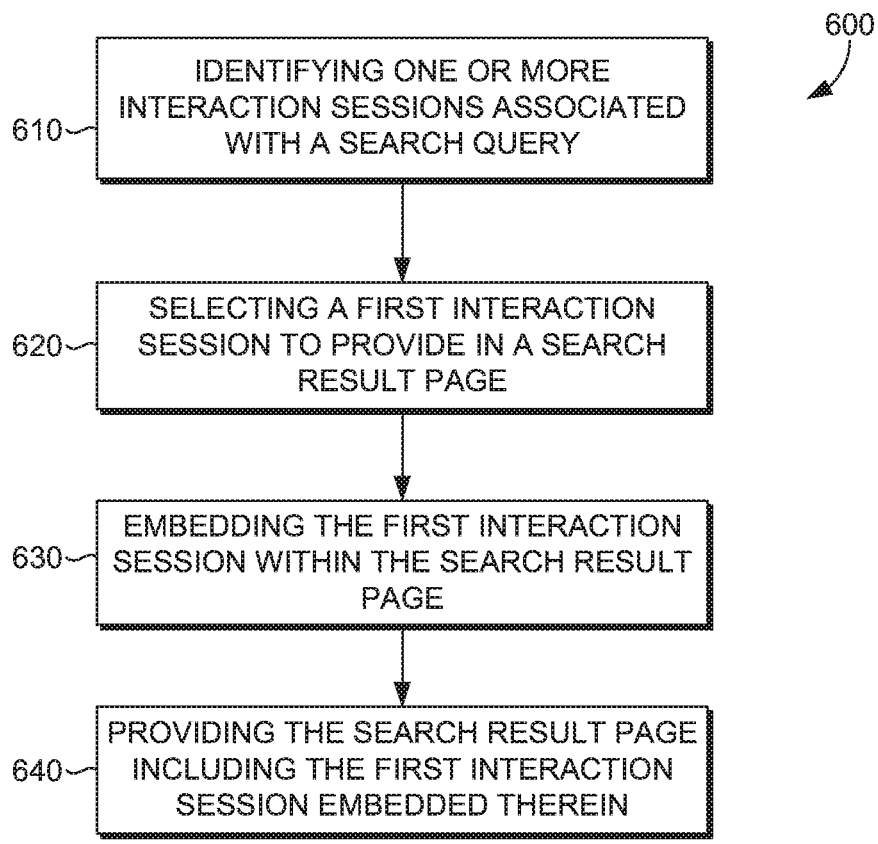
FIG. 6 is a diagram depicting a method, in accordance with an aspect of the technology described herein.

Turning now to FIG. 6, a method 600 for providing interaction sessions is provided, in accordance with an aspect of the technology described herein. Initially, at step 610, one or more interaction sessions associated with a search query are identified. At step 620, a first interaction session to provide in a search result page is selected and embedded within the search result page at step 630. The search result page including the first interaction session embedded therein is provided at step 640.

Figure 7:
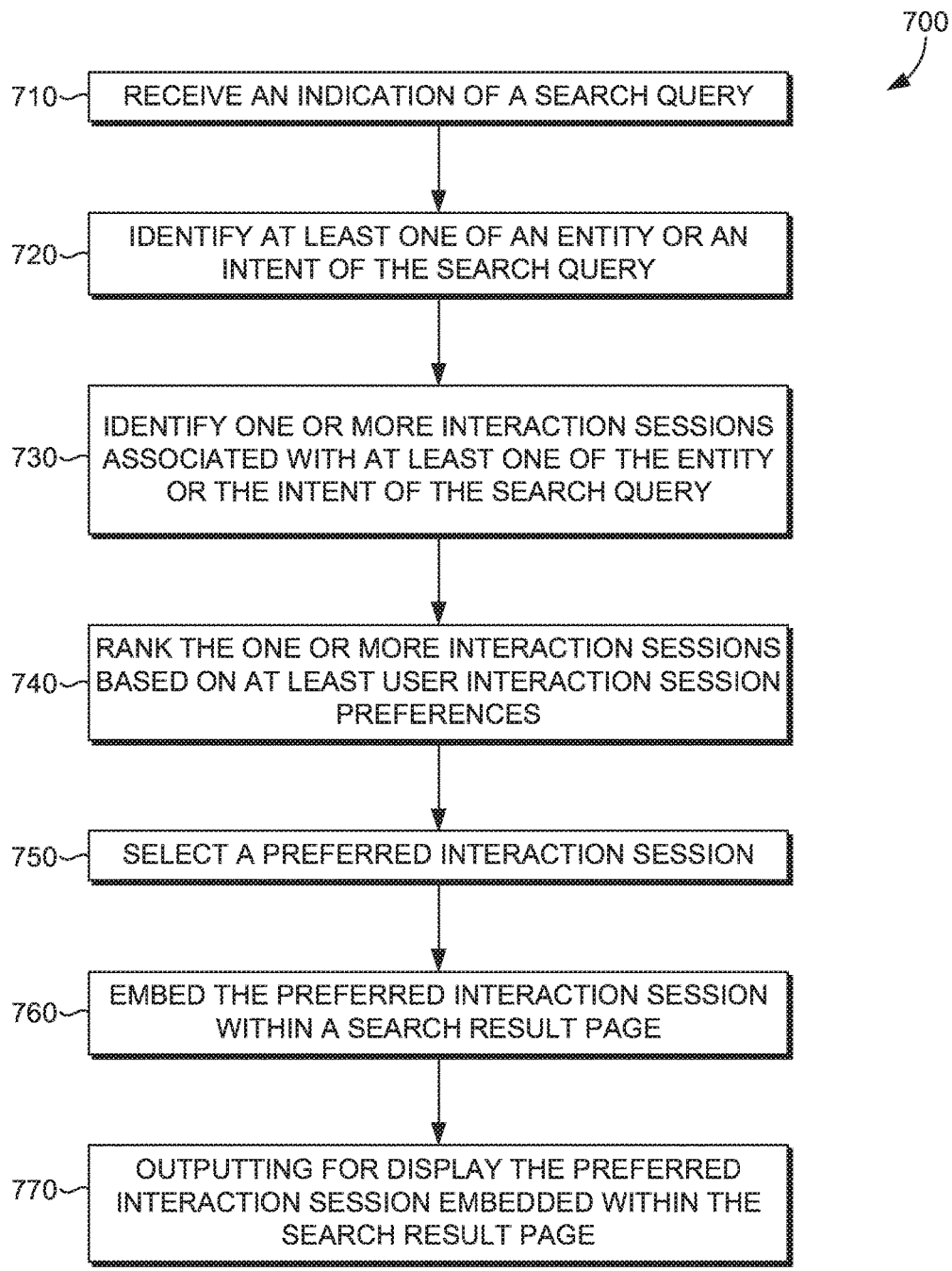
FIG. 7 is a diagram depicting a method, in accordance with an aspect of the technology described herein.

Turning now to FIG. 7, a method 700 for providing interaction sessions is provided, in accordance with an aspect of the technology described herein. Initially, at step 710, an indication of a search query is received. The indication of the search query may be received upon a search query being entered into a search query input area and submitted to a search engine. At step 720, at least one of an entity or an intent of the search query is identified. At step 730, one or more interaction sessions associated with at least one of the entity or the intent of the search query is identified. The one or more interaction sessions are ranked based on at least user interaction session preferences at step 740. A preferred interaction session is selected at step 750. A preferred interaction session is an interaction session having the highest ranking (a ranking higher than any other ranking of the other interaction sessions). The preferred interaction session is embedded within a search result page at step 760. The preferred interaction session embedded within the search result page is output for display at step 770.

Exemplary Operating Environment

Referring now to FIG. 8, an exemplary operating environment for implementing aspects of the technology described herein is shown and designated generally as computing device 800. Computing device 800 is but one example of a suitable computing environment and is not intended to suggest any limitation as to the scope of use of the technology described herein. Neither should the computing device 800 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 800, computing device 800 includes a bus 810 that directly or indirectly couples the following devices: memory 812, one or more processors 814, one or more presentation components 816, input/output (I/O) ports 818, I/O components 820, and an illustrative power supply 822. Bus 810 represents what may be one or more busses (such as an address bus, data bus, or a combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 8 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 8 and refer to "computer" or "computing device." The computing device 800 may be a PC, a tablet, a smartphone, virtual reality headwear, augmented reality headwear, a game console, and such.

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 812 includes computer storage media in the form of volatile and/or nonvolatile memory. The memory 812 may be removable, non-removable, or a combination thereof. Exemplary memory includes solid-state memory, hard drives, optical-disc drives, etc. Computing device 800 includes one or more processors 814 that read data from various entities such as bus 810, memory 812, or I/O components 820. Presentation component(s) 822 present data indications to a user or other device. Exemplary presentation components 822 include a display device, speaker, printing component, vibrating component, etc. I/O ports 818 allow computing device 800 to be logically coupled to other devices, including I/O components 820, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 814 may be direct or via a coupling utilizing a serial port, parallel port, and/or other interface and/or system bus known in the art. Furthermore, the digitizer input component may be a component separate from an output component such as a display device, or in some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 800. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 800. The computing device 800 may be equipped with depth cameras, such as stereoscopic camera systems, infrared camera systems, RGB camera systems, and combinations of these, for gesture detection and recognition. Additionally, the computing device 800 may be equipped with accelerometers or gyroscopes that enable detection of motion. The output of the accelerometers or gyroscopes may be provided to the display of the computing device 800 to render immersive augmented reality or virtual reality.

The computing device 800 may include a radio 824. The radio transmits and receives radio communications. The computing device 800 may be a wireless terminal adapted to receive communications and media over various wireless networks. Computing device 800 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth® connection to another computing device is a second example of a short-range connection. A long-range connection may include a connection using one or more of CDMA, GPRS, GSM, TDMA, and 802.16 protocols.

Aspects of the technology have been described to be illustrative rather than restrictive. It will be understood that certain features and subcombinations are of utility and may be employed without reference to other features and subcombinations. This is contemplated by and is within the scope of the claims.

The invention claimed is:

1. A computing system comprising:
   at least one processor; and
   memory having computer-executable instructions stored thereon that, based on execution by the at least one processor, configure the at least one processor to provide embedded interaction sessions by being configured to:
   identify one or more interaction sessions associated with a search query;
   select a first interaction session of the one or more interaction sessions to embed in a search result page including one or more search results, wherein selecting the first interaction session to embed in the search result page comprises:
      analyzing one of (a) user preferences associated with interaction sessions for a first user including a preferred type of interaction session and (b) historical data indicating past performance of the first interaction session for the search query or past performance of the first interaction session for the first user; and
   provide the search result page with both the first interaction session embedded therein and the one or more search results, wherein the search result page is provided to allow content within the first interaction session embedded into the search result page to be updated without updating the one or more search results of the search result page and to allow content within the search result page to be updated while content within the first interaction session remains the same.

2. The system of claim 1, wherein the processor is further configured to:
   output for display an interface for displaying the search result page having the first interaction session embedded therein.

3. The system of claim 1, wherein the one or more interaction sessions are identified as being associated with the search query based on one or more of an intent of the search query or an entity of the search query.

4. The system of claim 1, wherein the processor is further configured to:
   receive an indication to share the first interaction session on a social media networking site.

5. The system of claim 1, wherein the one or more interaction sessions include at least one of a quiz, a poll, or a game.

6. The system of claim 1, wherein the processor is further configured to:
   provide the search results page in a way that allows interaction with the first interaction session without changing other content of the search result page.

7. A method of providing interaction sessions comprising:
   identifying one or more interaction sessions associated with a search query, wherein the one or more interaction sessions are activities with which users interact;
   selecting a first interaction session of the one or more interaction sessions to embed in a search result page including one or more search results, wherein selecting the first interaction session to embed in the search result page comprises: analyzing one of (a) user preferences associated with interaction sessions for a first user including a preferred type of interaction session and (b) historical data indicating past performance of the first interaction session for the search query or past performance of the first interaction session for the first user;
   embedding the first interaction session within the search result page; and
   providing the search result page with both the first interaction session embedded therein and the one or more search results, wherein the search result page is provided to allow content within the first interaction session embedded into the search result page to be updated without updating the one or more search results of the search result page and to allow content within the search result page to be updated while content within the first interaction session remains the same.

8. The method of claim 7, further comprising:
   providing the one or more search results within the search result page along with the first interaction session embedded in the search result page, wherein the one or more search results remain constant during interactions with the first interaction session.

9. The method of claim 8, further comprising:
   outputting for display an interface for displaying the search result page having the first interaction session embedded therein.

10. The method of claim 7, wherein the one or more interaction sessions are identified as being associated with the search query based on an intent of the search query.

11. The method of claim 7, wherein the one or more interaction sessions are identified as being associated with the search query based on an entity of the search query, wherein an entity is a subject of a search query.

12. The method of claim 7, wherein the one or more interactions include games, quizzes, and polls.

13. The method of claim 7, wherein the first interaction session is selected based on one more user preferences of interaction sessions.

14. One or more computer storage media having computer executable instructions embodied thereon, that when executed, cause a computing device to perform a method of providing interaction sessions, the method comprising:
   receiving an indication of a search query;
   identifying at least one of an entity or an intent of the search query;
   identifying one or more interaction sessions associated with at least one of the entity or the intent of the search query;

ranking the one or more interaction sessions associated with the entity or the intent of the search query based on at least one of (a) user interaction session preferences including a preferred type of interaction session for a user or (b) historical data indicating past performance of each of the one or more interaction sessions for the search query or past performance of each of the one or more interaction sessions for the user;

selecting a preferred interaction session to embed into a search result page based on at least one of the user interaction session preferences or the historical data of past performance of the one or more interaction sessions;

embedding the preferred interaction session into the search result page, wherein the search result page includes other content;

outputting for display the preferred interaction session embedded within the search result page;

receiving an interaction from a user with the preferred interaction session;

updating content of the preferred interaction session based on the interaction received from the user while avoiding an update of the other content of the search result page;

providing the search result page with both the preferred interaction session with updated content embedded into the search result page and the other content that was not updated;

receiving a second interaction from the user with other content of the search result page;

updating the content of the search result page while the content of the preferred interaction session remains the same; and providing an updated search result page with both the content of the search result page that was updated and the content of the preferred interaction session that remains the same.

15. The computer storage media of claim 14, wherein the one or more interaction sessions includes quizzes, polls, or games.

16. The computer storage media of claim 14, wherein the search result page outputted includes both the preferred interaction session embedded therein and at least one search result.

17. The computer storage media of claim 16, the search result page is configured such that the at least one search result remains constant during interactions with the preferred interaction session.

* * * * *